(12) United States Patent
Chormanski (10) Patent No.: US 9,296,287 B1
(45) Date of Patent: Mar. 29, 2016

(54) MIRROR COVER SYSTEMS

(71) Applicant: Stanley Chormanski, Garfield, NJ (US)

(72) Inventor: Stanley Chormanski, Garfield, NJ (US)

( * ) Notice: Subject to any disclaimer, the term of this patent is extended or adjusted under 35 U.S.C. 154(b) by 0 days.

(21) Appl. No.: 14/531,938

(22) Filed: Nov. 3, 2014

Related U.S. Application Data

(60) Provisional application No. 61/903,333, filed on Nov. 12, 2013.

(51) Int. Cl.
*G02B 23/16* (2006.01)
*B60J 11/06* (2006.01)
*G02B 27/00* (2006.01)

(52) U.S. Cl.
CPC ............ *B60J 11/06* (2013.01); *G02B 27/0006* (2013.01)

(58) Field of Classification Search
CPC ............ B60J 11/06; B60J 11/08; B60R 1/06; G02B 27/0006
USPC ................... 359/507, 511; 150/166; 296/95.1
See application file for complete search history.

(56) References Cited

U.S. PATENT DOCUMENTS

| | | | |
|---|---|---|---|
| 4,834,157 A | 5/1989 | Smith | |
| D390,529 S | 2/1998 | Adams et al. | |
| D435,344 S | 12/2000 | Harrison | |
| 6,325,121 B1 | 12/2001 | Hudnall | |
| 2012/0154911 A1* | 6/2012 | Huynh | B60J 11/06 359/511 |

* cited by examiner

*Primary Examiner* — Euncha Cherry
(74) *Attorney, Agent, or Firm* — RG Patent Consulting, LLC; Rachel Gilboy (57) ABSTRACT

A protective mirror cover removably-coupleable to a vehicle side mirror system includes a protective mirror cover assembly including a first fitted sheath for fitting a first vehicle side mirror having a first outer wall, a first inner wall, a first right sidewall, a first left sidewall, a first bottom wall, a first inner volume, a first opening; and at least one first adjustable securing band; a second fitted sheath for fitting a second vehicle side mirror having a second outer wall, a second inner wall, a second right sidewall, a second left sidewall, a second bottom wall, a second inner volume, a second opening, and at least one second securing band.

19 Claims, 5 Drawing Sheets

MIRROR COVER SYSTEMS

CROSS-REFERENCE TO RELATED APPLICATION

The present application is related to and claims priority from prior provisional application Ser. No. 61/903,333, filed Nov. 12, 2013 which application is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR 1.71(d).

The following includes information that may be useful in understanding the present invention(s). It is not an admission that any of the information provided herein is prior art, or material, to the presently described or claimed inventions, or that any publication or document that is specifically or implicitly referenced is prior art.

BACKGROUND OF THE INVENTION

1. Field of the Invention

The present invention relates generally to the field of protective covering devices and more specifically relates to a protective mirror cover removably-coupleable to a vehicle side mirror system.

2. Description of the Related Art

Many individuals own vehicles in modern society. Since an automobile is such a valuable and practical investment, most consumers regularly undergo simple steps to ensure the long life and smooth operation of their vehicle. Regularly changing the engine oil, checking the tire pressure and making sure that the brake and power steering fluid are at appropriate levels, are but a few key tasks involved in routine car maintenance. Perhaps one of the most popular and surprisingly simple means of caring for one's vehicle is to attach a "bra" to the front end of the car.

Tailored for the make and model of the vehicle, car bras are configured to completely cover all, or a portion of, the front grille and lower hood of the car and are typically held in place via hooks, snaps or straps which are secured on either side of the car underneath the framework, directly in front of the front tires. Designed to serve the very useful function of protecting the car's surface and paint from the nicks, dents, scratches and chips that often occur during regular travel, car bras are valuable commodities in that ensure the pristine appearance of the car, even after thousands of miles of use. Serving to deflect flying gravel, dirt and other debris from hitting the car's grille and hood, car bras can also protect these components from harsh weather conditions including rain, snow and sleet. In this manner, application of a car bra can prevent deterioration caused by rust and similar damage, thus extending the life of the car. Car bras are however unable to completely protect the exterior of the vehicle.

Various attempts have been made to solve problems found in protective covering devices art. Among these are found in: U.S. Pat. No. 4,834,157 to Gerard Smith; U.S. Pat. No. D435,344 to Jolene M Harrison; U.S. Pat. No. 6,325,121 to Shea D. Hudnall; and U.S. Pat. No. D390,529 to Kenneth Adams et al. This prior art is representative of protective covering devices for protecting exterior mirrors on vehicles from the elements. None of the above inventions and patents, taken either singly or in combination, is seen to describe the invention as claimed.

Ideally, a protective mirror cover removably-coupleable to a vehicle side mirror system should be user-friendly and safe in-use and, yet may operate reliably and be manufactured at a modest expense. Thus, a need exists for a protective mirror cover removably-coupleable to a vehicle side mirror system which provides a user-driver a simple and effective means of protecting the first vehicle side mirror and the second vehicle side mirror from dirt and insects, as well as damage and non-use potentially caused by inclement weather and harsh elements including rain, hail, ice and snow, yet not detracting from the aesthetic appearance of a finish of the vehicle.

BRIEF SUMMARY OF THE INVENTION

In view of the foregoing disadvantages inherent in the known protective covering device art, the present invention provides a protective mirror cover removably-coupleable to a vehicle side mirror system (entitled Mirror Cover Systems). The general purpose of the present invention, which will be described subsequently in greater detail is to provide a protective mirror cover removably-coupleable to a vehicle side mirror system which provides a user-driver a simple and effective means of protecting the first vehicle side mirror and the second vehicle side mirror from dirt and insects without detracting from the aesthetic appearance of a finish of the vehicle.

A protective mirror cover removably-coupleable to a vehicle side mirror system is disclosed herein which comprises: a protective mirror cover assembly including a first fitted sheath for fitting a first vehicle side mirror having a first outer wall, a first inner wall, a first right sidewall, a first left sidewall, a first bottom wall, a first inner volume, a first opening, and at least one first adjustable securing band, a second fitted sheath for fitting a second vehicle side mirror having a second outer wall, a second inner wall, a second right sidewall, a second left sidewall, a second bottom wall, a second inner volume, a second opening, and at least one second securing band. The protective mirror cover removably-coupleable to a vehicle side mirror system comprises said protective mirror cover assembly. The protective mirror cover removably-coupleable to a vehicle side mirror assembly provides the user-driver a simple and effective means of protecting the first vehicle side mirror and the second vehicle side mirror from dirt and insects, as well as inclement weather and harsh elements including rain, hail, ice and snow, without detracting from an aesthetic appearance of a finish of the vehicle.

The protective mirror cover assembly preferably comprises weatherproof vinyl such that it is waterproof and durable to protect the first vehicle side mirror and the second vehicle side mirror from the inclement weather and the harsh elements. The protective mirror cover removably-coupleable to a vehicle side mirror assembly does not obstruct viewing out of the vehicle side mirror for aiding a user-driver to see areas behind and to a driver side and a passenger side of the vehicle, outside of peripheral vision of the user-driver. The vehicle comprises an automobile. The automobile for example comprises a car or other such vehicle.

The first inner volume of the first fitted sheath is defined by the first outer wall; the first inner wall; the first right sidewall; the first left sidewall; and the first bottom wall. The first opening permits a user-driver to slide the first fitted sheath over the first vehicle side mirror. The first opening comprising at least one elastic band located around a periphery of the first opening to permit the first fitted sheath to accommodate various sized models of the first vehicle side mirror. The first fitted sheath further comprises a transparent section dimensioned to fit over the first vehicle side mirror thereby allowing the user-driver unimpeded view out of the first vehicle side mirror in order to prevent the first fitted sheath not having to be removed when the vehicle is in an in-use condition. This feature also helps to keep environmental elements off the mirror(s) such as accumulations of snow or ice for example.

The at least one first adjustable securing band is removably attachable about the first vehicle side mirror to secure the first fitted sheath to the first vehicle side mirror. The at least one first adjustable securing band comprises at least one fastener. The at least one fastener comprises at least one drawstring in preferred embodiments.

In a similar manner, the second inner volume of the second fitted sheath is defined by the second outer wall; the second inner wall; the second right sidewall; the second left sidewall; and the second bottom wall. The second opening permits the user-driver to slide the second fitted sheath over the second vehicle side mirror. The second opening comprising at least one elastic band located around a periphery of the second opening to permit the second fitted sheath to accommodate various sized models of the second vehicle side mirror. The second fitted sheath further comprises a transparent section dimensioned to fit over the second vehicle side mirror thereby allowing the user-driver unimpeded view out of the second vehicle side mirror in order to prevent the second fitted sheath not having to be removed when the vehicle is in an in-use condition.

The at least one second adjustable securing band is removably attachable about the second vehicle side mirror to secure the second fitted sheath to the second vehicle side mirror. The at least one second adjustable securing band comprises at least one fastener. The at least one fastener comprises at least one drawstring in preferred embodiments; other fastening means may be used.

A kit is also embodied herein for the protective mirror cover removably-coupleable to a vehicle side mirror system comprising at least one first fitted sheath in a user-preferred color or design; at least one at least one second fitted sheath in a user-preferred color or design (sold singly or as a pair); and a set of user-installation instructions.

A method of using a protective mirror cover removably-coupleable to a vehicle side mirror system is also disclosed herein comprising the steps of: choosing a first fitted sheath in a user-preferred color; choosing a second fitted sheath in a user-preferred color; inserting the first fitted sheath over a first vehicle side mirror; tightening the first fitted sheath over the first vehicle side mirror via at least one drawstring to secure the first fitted sheath in place; inserting the second fitted sheath over a first vehicle side mirror; tightening the second fitted sheath over the second vehicle side mirror via at least one drawstring to secure the first fitted sheath in place; a user-driving the vehicle; loosening the first fitted sheath when no longer needed via the drawstring; removing the first fitted sheath for future use; loosening the second fitted sheath when no longer needed via the drawstring; and removing the second fitted sheath for future use.

The present invention holds significant improvements and serves as a protective mirror cover removably-coupleable to a vehicle side mirror system. For purposes of summarizing the invention, certain aspects, advantages, and novel features of the invention have been described herein. It is to be understood that not necessarily all such advantages may be achieved in accordance with any one particular embodiment of the invention. Thus, the invention may be embodied or carried out in a manner that achieves or optimizes one advantage or group of advantages as taught herein without necessarily achieving other advantages as may be taught or suggested herein. The features of the invention which are believed to be novel are particularly pointed out and distinctly claimed in the concluding portion of the specification. These and other features, aspects, and advantages of the present invention will become better understood with reference to the following drawings and detailed description.

BRIEF DESCRIPTION OF THE DRAWINGS

The figures which accompany the written portion of this specification illustrate embodiments and method(s) of use for the present invention protective mirror cover removably-coupleable to a vehicle side mirror system (entitled Mirror Cover Systems) constructed and operative according to the teachings of the present invention.

The various embodiments of the present invention will hereinafter be described in conjunction with the appended drawings, wherein like designations denote like elements.

DETAILED DESCRIPTION

As discussed above, embodiments of the present invention relate to a protective covering device and more particularly to a protective mirror cover removably-coupleable to a vehicle side mirror system (entitled Mirror Cover System) which provides a user-driver a simple and effective means of protecting the first vehicle side mirror and the second vehicle side mirror from dirt and insects, as well as inclement weather and harsh elements including rain, hail, ice and snow, without detracting from an aesthetic appearance of a finish of the vehicle.

Generally speaking, mirror covers systems comprises a specially designed set of automobile coverings specifically for the vehicle's side mirrors. The mirror covers systems may be produced in a variety of sizes appropriate for the side mirrors germane to all makes and models automobiles on the road, from four-door family sedans to massive 18-wheelers and buses.

The mirror covers system may be configured with a draw string system at its elasticized opening designed to secure the unit in place, on the back side of the mirror assembly. In this manner, these pouch-like accessories may be easily installed by the auto owner, without need of professional assistance. Hook and loop fasteners may be used.

Comprised of weatherproof vinyl and/or leather, the mirror covers systems may, as a consideration, feature a clear section sized and shaped appropriately for the unencumbered exposure of the mirror's glass, so that the mirror covers system may be conveniently kept in place while the vehicle is in operation. Packaged with two (2) units to accommodate each side mirror of a vehicle, the mirror covers systems may be made available in a variety of colors to match a vehicle's exterior, blending seamlessly with the car's aesthetic appearance.

The mirror covers system provides a practical means of protecting the finish and glass of the side mirrors on their vehicles. Offering a shield from dirt, insects, as well as inclement weather and harsh elements such as rain, hail, ice and snow, the mirror covers system may effectively extend the life of the car's mirror systems, a very necessary safety component of any motor vehicle. Consumers may appreciate that simply by securing the mirror covers system to their vehicle, expensive finishes, paint jobs and custom work are protected.

Manufactured in a variety of sizes appropriate for the various makes and models cars, trucks, sport utility vehicles, and tractor trailers and buses on the road, there may be a mirror covers system to meet the needs of virtually any automobile owner and operator.

Offering car enthusiasts a unique means of protecting their vehicle's finish and mirror glass as well as being simple to install and fully functional, these versatile accessories may prove a valuable commodity for any car owner. The mirror covers system(s) are cost-effective to produce in the embodiments, as shown starting in FIG. 1.

Figure 1:
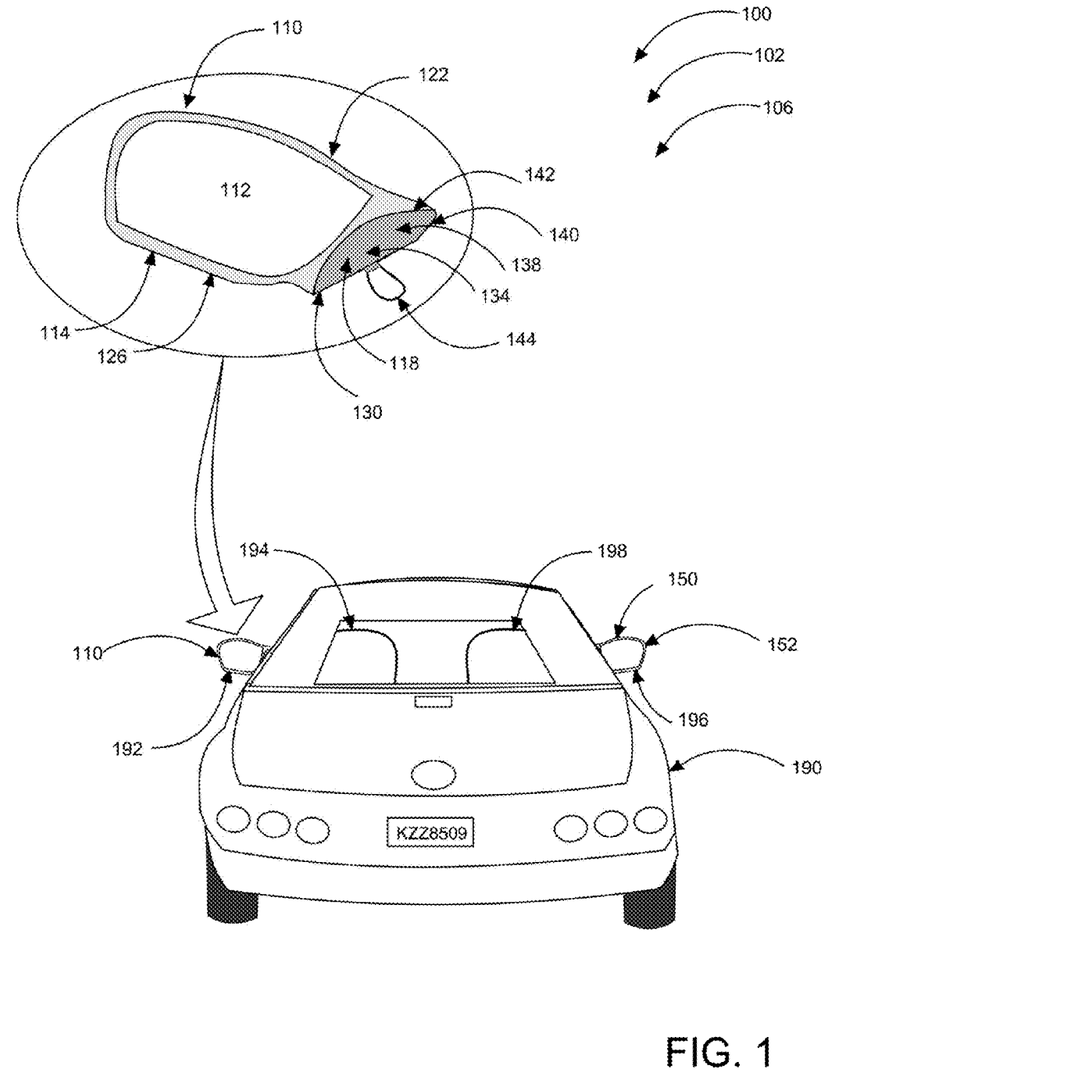
FIG. 1 shows a front perspective view illustrating a protective mirror cover removably-coupleable to a vehicle side mirror system in an 'in-use' condition according to an embodiment of the present invention.
Figure 2:
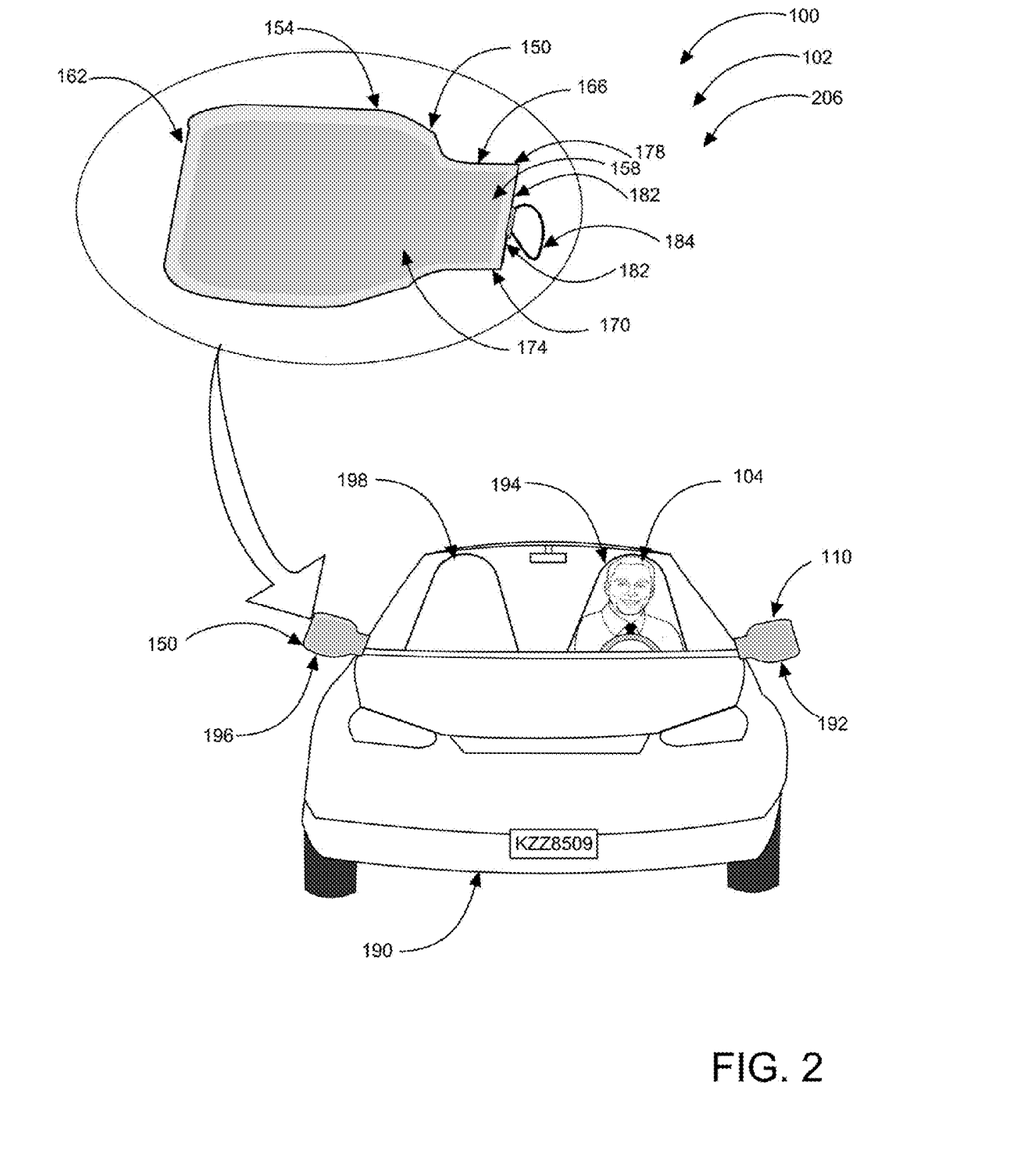
FIG. 2 shows a back perspective view illustrating the protective mirror cover removably-coupleable to a vehicle side mirror system in another 'in-use' condition according to an embodiment of the present invention
Figure 3:
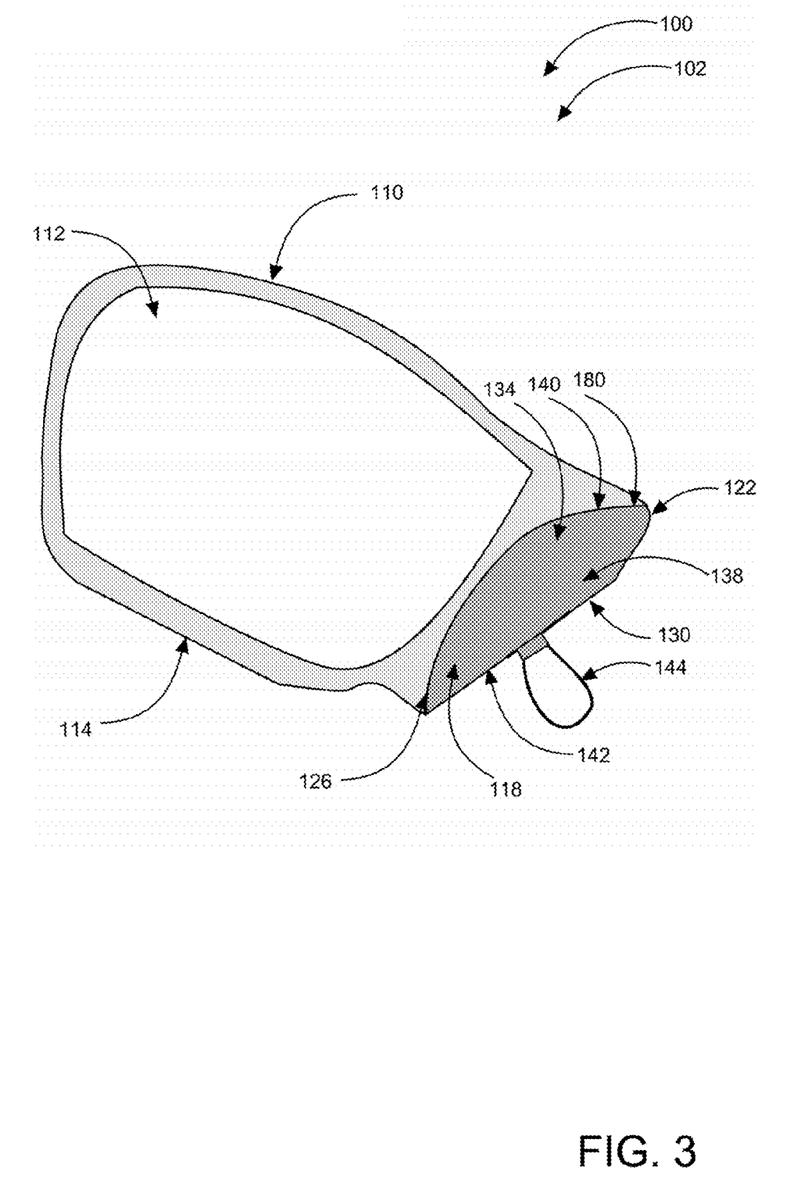
FIG. 3 is a perspective view illustrating a protective mirror cover assembly of the protective mirror cover removably-coupleable to a vehicle side mirror system according to an embodiment of the present invention. (show drawstring like in brochure)

Referring now to the drawings by numerals of reference there is shown in FIGS. 1-3 perspective views illustrating protective covering device 102 of protective mirror cover removably-coupleable to a vehicle side mirror system 100 according to an embodiment of the present invention.

Protective mirror cover removably-coupleable to a vehicle side mirror system 100 comprises: protective mirror cover assembly 102 including first fitted sheath 110 for fitting a first vehicle side mirror 192 having first outer wall 114, first inner wall 118, first right sidewall 122, first left sidewall 126, first bottom wall 130, first inner volume 134, first opening 138; and at least one first adjustable securing band 142; second fitted sheath 150 for fitting second vehicle side mirror 196 having second outer wall 154, second inner wall 158, second right sidewall 162, second left sidewall 166, second bottom wall 170, second inner volume 174, second opening 178, and at least one second securing band 182. Protective mirror cover removably-coupleable to a vehicle side mirror system 100 preferably comprises protective mirror cover assembly 102. Protective mirror cover removably-coupleable to a vehicle side mirror assembly 102 provides user-driver 104 a simple and effective means of protecting first vehicle side mirror 192 and second vehicle side mirror 196 from dirt and insects, as well as inclement weather and harsh elements including rain, hail, ice and snow, without detracting from an aesthetic appearance of a finish of vehicle 190 as shown in in-use condition 106 of FIG. 1 and in-use condition 206 in FIG. 2.

Protective mirror cover assembly 102 comprises weatherproof vinyl being waterproof and durable to protect first vehicle side mirror 110 and second vehicle side mirror 150 from inclement weather and harsh elements. Upon reading this specification, it should be appreciated that, under appropriate circumstances, considering such issues as user preferences, design preference, structural requirements, marketing preferences, cost, available materials, technological advances, etc., other material arrangements such as, for example, weatherproof leather, etc., may be sufficient.

Protective mirror cover removably-coupleable to a vehicle side mirror assembly 102 does not obstruct viewing out of vehicle side mirror (first vehicle side mirror 192 and second vehicle side mirror 196) for aiding user-driver 104 to see areas behind and to driver side 194 and passenger side 196 of vehicle 190, outside of peripheral vision of user-driver 104. Vehicle 190 comprises an automobile. The automobile may comprise a car or other such vehicle. Upon reading this specification, it should be appreciated that, under appropriate circumstances, considering such issues as user preferences, design preference, structural requirements, marketing preferences, cost, available materials, technological advances, etc., other vehicle arrangements such as, for example, SUV, pickup truck, van, or an 18-wheeler etc., may be sufficient.

First inner volume 134 of first fitted sheath 110 is defined by first outer wall 114; first inner wall 118; first right sidewall 122; first left sidewall 126; and first bottom wall 130. First opening 138 permits user-driver 104 to slide first fitted sheath 110 over first vehicle side mirror 110. First opening 138 comprising at least one elastic band 140 located around a periphery of first opening 138 to permit first fitted sheath 110 to accommodate various sized models of first vehicle side mirror 192. First fitted sheath 110 further comprises transparent section 112 dimensioned to fit over first vehicle side mirror 192 thereby allowing user-driver 104 unimpeded view out of first vehicle side mirror 192 in order to prevent first fitted sheath 110 not having to be removed when vehicle 190 is in in-use condition 106 as shown in FIG. 1.

At least one first adjustable securing band 142 is removably attachable about first vehicle side mirror 192 to secure first fitted sheath 110 to first vehicle side mirror 192. At least one first adjustable securing band 142 comprises at least one fastener 144. At least one fastener 144 may comprise at least one drawstring. Upon reading this specification, it should be appreciated that, under appropriate circumstances, considering such issues as user preferences, design preference, structural requirements, marketing preferences, cost, available materials, technological advances, etc., other fastener arrangements such as, for example, hook and loop, cords, etc., may be sufficient. Hook and loop fasteners may be used.

Second inner volume 174 of second fitted sheath 150 is defined by second outer wall 154, second inner wall 158, second right sidewall 162, second left sidewall 166, and second bottom wall 170. Second opening 178 permits user-driver 104 to slide second fitted sheath 150 over second vehicle side mirror 196. Second opening 178 comprising at least one elastic band 180 located around a periphery of second opening 178 to permit second fitted sheath 150 to accommodate various sized models of second vehicle side mirror 196. Second fitted sheath 150 further comprises transparent section 152 dimensioned to fit over second vehicle side mirror 150 thereby allowing user-driver 104 unimpeded view out of second vehicle side mirror 196 in order to prevent second fitted sheath 150 not having to be removed when vehicle 190 is in in-use condition 106.

At least one second adjustable securing band 182 is removably attachable about second vehicle side mirror 196 to secure second fitted sheath 150 to second vehicle side mirror 150. At least one second adjustable securing band 182 comprises at least one fastener 184. At least one fastener 184 may comprise at least one drawstring. Upon reading this specification, it should be appreciated that, under appropriate circumstances, considering such issues as user preferences, design preference, structural requirements, marketing preferences, cost, available materials, technological advances, etc., other fastener arrangements such as, for example, hook and loop, cords, etc., may be sufficient.

Figure 4:
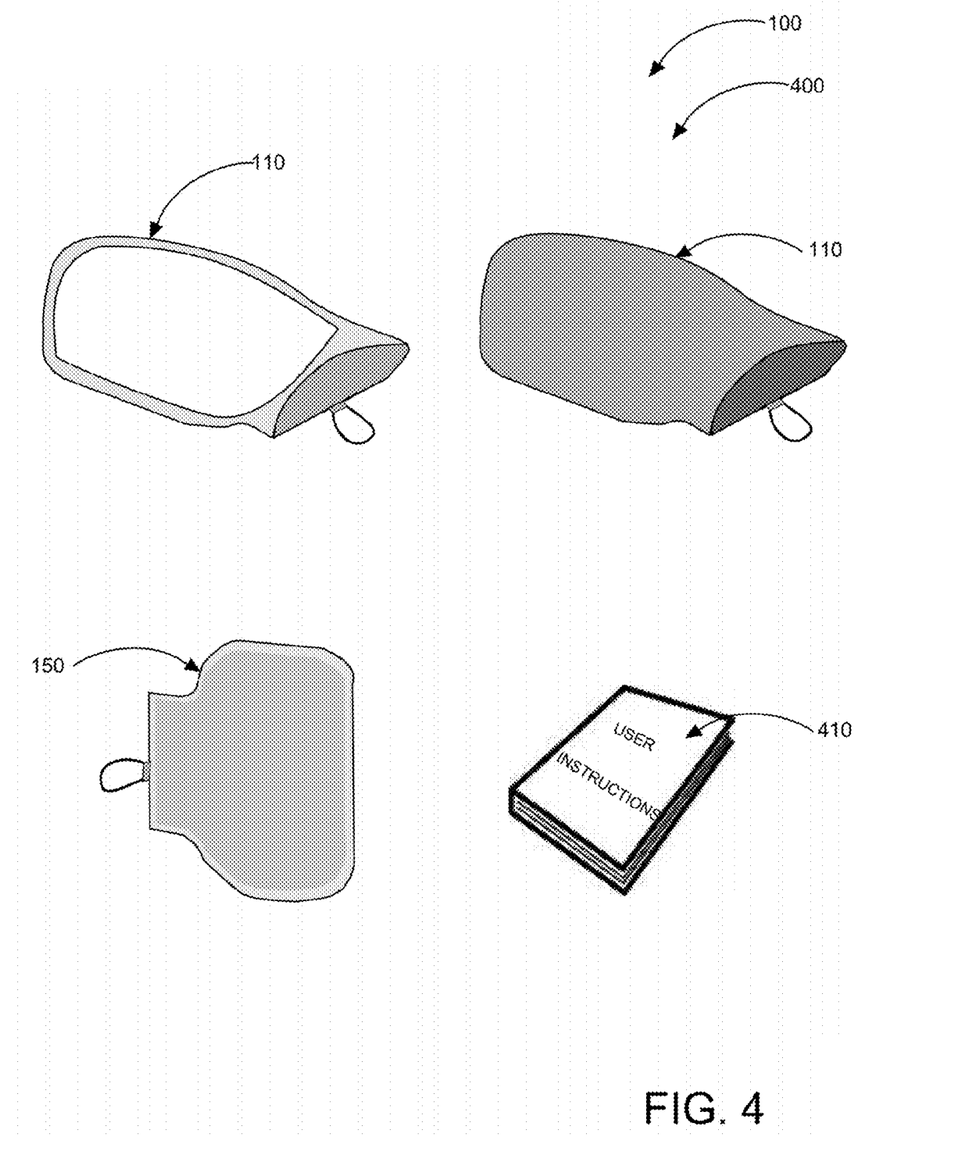
FIG. 4 is a perspective view illustrating a kit of the protective mirror cover removably-coupleable to a vehicle side mirror system according to an embodiment of the present invention.

Referring now to FIG. 4 showing a perspective view illustrating kit 400 of protective mirror cover removably-coupleable to a vehicle side mirror system 100 according to an embodiment of the present invention of FIG. 1

Kit 400 is embodied herein for the protective mirror cover removably-coupleable to a vehicle side mirror system 100 comprising at least one first fitted sheath 110 in a user-preferred color or design; at least one at least one second fitted sheath 150 in a user-preferred color or design; and a set of user-installation instructions 410. Protective mirror cover removably-coupleable to a vehicle side mirror system 100 may be manufactured and provided for sale in a wide variety of sizes and shapes for a wide assortment of applications. Upon reading this specification, it should be appreciated that, under appropriate circumstances, considering such issues as design preference, user preferences, marketing preferences, cost, structural requirements, available materials, technological advances, etc., other kit contents or arrangements such as, for example, including more or less components, customized parts, different color/design combinations, parts may be sold separately, etc., may be sufficient.

Figure 5:
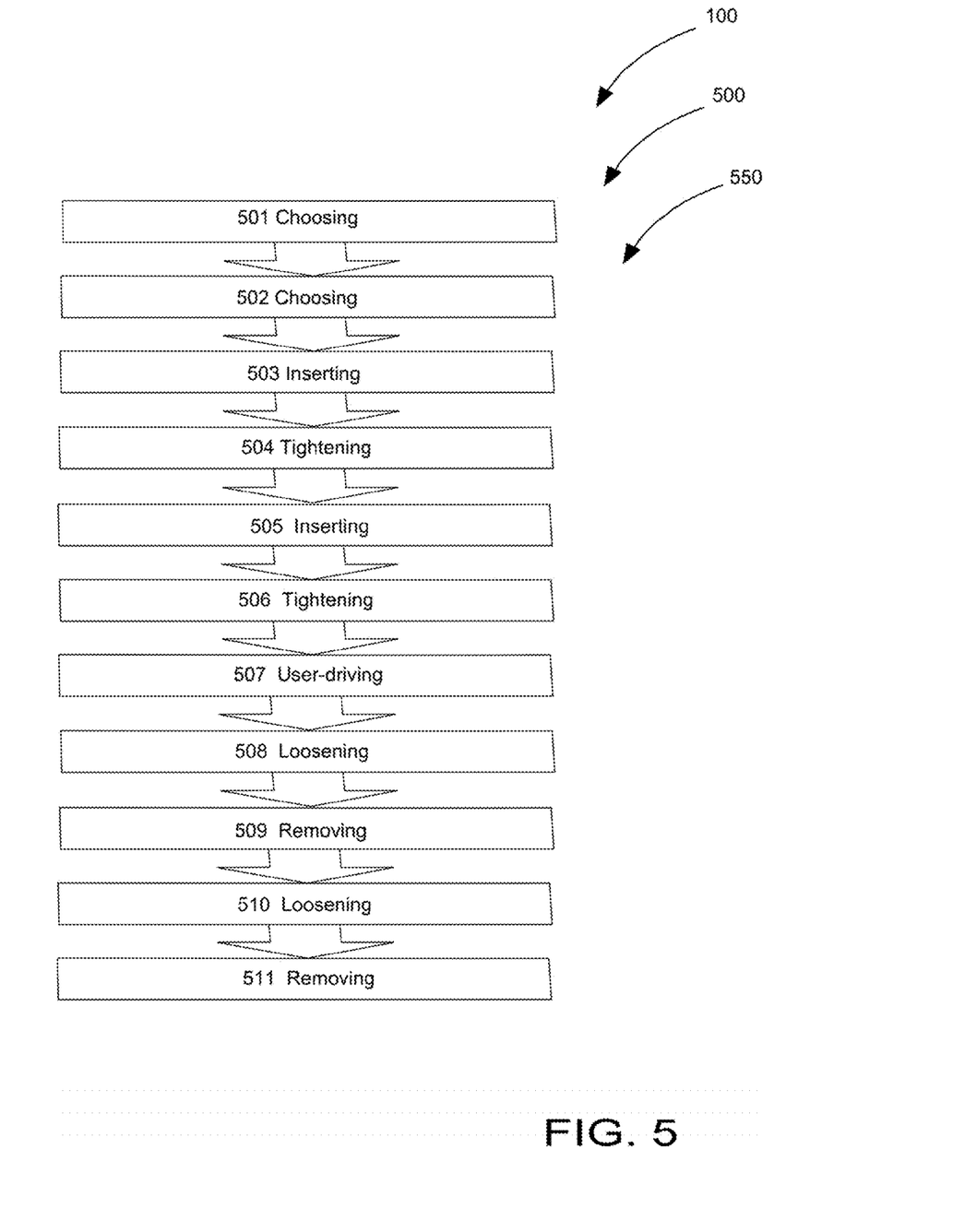
FIG. 5 is a flowchart illustrating a method of use for the protective mirror cover removably-coupleable to a vehicle side mirror system according to an embodiment of the present invention of FIGS. 1-4.

Referring now to FIG. 5, flowchart 550 illustrating method of use 500 for protective mirror cover removably-coupleable to a vehicle side mirror system is 100 according to an embodiment of the present invention of FIGS. 1-4.

Method of using protective mirror cover removably-coupleable to a vehicle side mirror system 100 comprises the steps of: step one 501 choosing first fitted sheath 110 in a user-preferred color; step two 502 choosing second fitted sheath 150 in a user-preferred color; step three 503 inserting first fitted sheath 110 over first vehicle side mirror 192; step four 504 tightening first fitted sheath 110 over first vehicle side mirror 192 via at least one drawstring to secure first fitted sheath 110 in place; step five 505 inserting second fitted sheath 150 over second vehicle side mirror 196; step six 506 tightening second fitted sheath 150 over second vehicle side mirror 196 via at least one drawstring to secure first fitted sheath 110 in place; step seven 507 a user-driving vehicle 190; step eight 508 loosening first fitted sheath 110 when no longer needed via said drawstring; step nine 509 removing first fitted sheath 110 for future use; step ten 510 loosening second fitted sheath 150 when no longer needed via said drawstring; and step eleven 511 removing second fitted sheath 150 for future use.

It should be noted that the steps described in the method of use can be carried out in many different orders according to user preference. The use of "step of" should not be interpreted as "step for", in the claims herein and is not intended to invoke the provisions of 35 U.S.C. §112, ¶916. Upon reading this specification, it should be appreciated that, under appropriate circumstances, considering such issues as design preference, user preferences, marketing preferences, cost, structural requirements, available materials, technological advances, etc., other methods of use arrangements such as, for example, different orders within above-mentioned list, elimination or addition of certain steps, including or excluding certain maintenance steps, etc., may be sufficient.

The embodiments of the invention described herein are exemplary and numerous modifications, variations and rearrangements can be readily envisioned to achieve substantially equivalent results, all of which are intended to be embraced within the spirit and scope of the invention. Further, the purpose of the foregoing abstract is to enable the U.S. Patent and Trademark Office and the public generally, and especially the scientist, engineers and practitioners in the art who are not familiar with patent or legal terms or phraseology, to determine quickly from a cursory inspection the nature and essence of the technical disclosure of the application.

What is claimed is new and desired to be protected by Letters Patent is set forth in the appended claims:

1. A protective mirror cover removably-coupleable to a vehicle side mirror system comprising:
    a protective mirror cover assembly including,
        a first fitted sheath for fitting a first vehicle side mirror having;
            a first outer wall;
            a first inner wall;
            a first right sidewall;
            a first left sidewall;
            a first bottom wall;
            a first inner volume;
            a first opening; and
            at least one first adjustable securing band;
        a second fitted sheath for fitting a second vehicle side mirror having;
            a second outer wall;
            a second inner wall;
            a second right sidewall;
            a second left sidewall;
            a second bottom wall;
            a second inner volume;
            a second opening; and
            at least one second securing band;
    wherein said protective mirror cover removably-coupleable to a vehicle side mirror system comprises said protective mirror cover assembly;
    wherein said first inner volume of said first fitted sheath is defined by said first outer wall; said first inner wall; said first right sidewall; said first left sidewall; and said first bottom wall;
    wherein said second inner volume of said second fitted sheath is defined by said second outer wall; said second inner wall; said second right sidewall; said second left sidewall; and said second bottom wall;
    wherein said first opening permits a user-driver to slide said first fitted sheath over said first vehicle side mirror;
    wherein said at least one first adjustable securing band is removably attachable about said first vehicle side mirror to secure said first fitted sheath to said first vehicle side mirror;
    wherein said second opening permits said user-driver to slide said second fitted sheath over said second vehicle side mirror;
    wherein said at least one second adjustable securing band is removably attachable about said second vehicle side mirror to secure said second fitted sheath to said second vehicle side mirror;
    wherein said protective mirror cover removably-coupleable to a vehicle side mirror assembly does not obstruct viewing out of said vehicle side mirror for aiding a user-driver to see areas behind and to a driver side and a passenger side of said vehicle, outside of peripheral vision of said user-driver; and
    wherein said protective mirror cover is adapted to protect said first vehicle side mirror and said second vehicle side mirror from dirt and insects, as well as inclement weather and harsh elements including rain, hail, ice and snow, without detracting from an aesthetic appearance of a finish of said vehicle.

2. The protective mirror cover removably-coupleable to a vehicle side mirror system of claim 1 wherein said protective mirror cover assembly comprises weatherproof vinyl being waterproof and durable to protect said first vehicle side mirror and said second vehicle side mirror from said inclement weather and said harsh elements.

3. The protective mirror cover removably-coupleable to a vehicle side mirror system of claim 1 wherein said protective mirror cover assembly comprises weatherproof leather being waterproof and durable to protect said first vehicle side mirror and said second vehicle side mirror from said inclement weather and said harsh elements.

4. The protective mirror cover removably-coupleable to a vehicle side mirror system of claim 1 wherein said first opening comprising at least on elastic band located around a periphery of said first opening to permit said first fitted sheath to accommodate various sized models of said first vehicle side mirror.

5. The protective mirror cover removably-coupleable to a vehicle side mirror system of claim 4 wherein said at least one first adjustable securing band comprises at least one fastener.

6. The protective mirror cover removably-coupleable to a vehicle side mirror system of claim 5 wherein said at least one fastener comprises at least one drawstring.

7. The protective mirror cover removably-coupleable to a vehicle side mirror system of claim 5 wherein said at least one fastener comprises at least one hook and loop system.

8. The protective mirror cover removably-coupleable to a vehicle side mirror system of claim 4 wherein said second opening comprising at least on elastic band located around a periphery of said second opening to permit said second fitted sheath to accommodate various sized models of said second vehicle side mirror.

9. The protective mirror cover removably-coupleable to a vehicle side mirror system of claim 4 wherein said at least one second adjustable securing band comprises at least one fastener.

10. The protective mirror cover removably-coupleable to a vehicle side mirror system of claim 8 wherein said at least one fastener comprises at least one drawstring.

11. The protective mirror cover removably-coupleable to a vehicle side mirror system of claim 8 wherein said at least one fastener comprises at least one hook and loop system.

12. The protective mirror cover removably-coupleable to a vehicle side mirror system of claim 1 wherein said first fitted sheath further comprises a transparent section dimensioned to fit over said first vehicle side mirror thereby allowing said user-driver unimpeded view out of said first vehicle side mirror in order to prevent said first fitted sheath not having to be removed when said vehicle is in an in-use condition.

13. The protective mirror cover removably-coupleable to a vehicle side mirror system of claim 1 wherein said second fitted sheath further comprises a transparent section dimensioned to fit over said second vehicle side mirror thereby allowing said user-driver unimpeded view out of said second vehicle side mirror in order to prevent said second fitted sheath not having to be removed when said vehicle is in an in-use condition.

14. The protective mirror cover removably-coupleable to a vehicle side mirror system of claim 13 wherein said automobile comprises a car.

15. The protective mirror cover removably-coupleable to a vehicle side mirror system of claim 13 wherein said automobile comprises an SUV.

16. The protective mirror cover removably-coupleable to a vehicle side mirror system of claim 13 wherein said automobile comprises a pick-up truck.

17. The protective mirror cover removably-coupleable to a vehicle side mirror system of claim 13 wherein said automobile comprises an 18-wheeler.

18. A protective mirror cover removably-coupleable to a vehicle side mirror system comprising:
a protective mirror cover assembly including,
a first fitted sheath for fitting a first vehicle side mirror having;
a first outer wall;
a first inner wall;
a first right sidewall;
a first left sidewall;
a first bottom wall;
a first inner volume;
a first opening; and
at least one first adjustable securing band;
a second fitted sheath for fitting a second vehicle side mirror having;
a second outer wall;
a second inner wall;
a second right sidewall;
a second left sidewall;
a second bottom wall;
a second inner volume;
a second opening; and
at least one second securing band;
wherein said protective mirror cover removably-coupleable to a vehicle side mirror system comprises said protective mirror cover assembly;
wherein said protective mirror cover assembly comprises weatherproof vinyl being waterproof and durable to protect said first vehicle side mirror and said second vehicle side mirror from said inclement weather and said harsh elements;
wherein said vehicle comprises an automobile;
wherein said automobile comprises a car;
wherein said first inner volume of said first fitted sheath is defined by said first outer wall; said first inner wall; said first right sidewall; said first left sidewall; and said first bottom wall;
wherein said first opening permits a user-driver to slide said first fitted sheath over said first vehicle side mirror;
wherein said first opening comprising at least on elastic band located around a periphery of said first opening to permit said first fitted sheath to accommodate various sized models of said first vehicle side mirror;
wherein said first fitted sheath further comprises a transparent section dimensioned to fit over said first vehicle side mirror thereby allowing said user-driver unimpeded view out of said first vehicle side mirror in order to prevent said first fitted sheath not having to be removed when said vehicle is in an in-use condition;
wherein said at least one first adjustable securing band is removably attachable about said first vehicle side mirror to secure said first fitted sheath to said first vehicle side mirror;
wherein said at least one first adjustable securing band comprises at least one fastener;
wherein said at least one fastener comprises at least one drawstring;
wherein said second inner volume of said second fitted sheath is defined by said second outer wall; said second inner wall; said second right sidewall; said second left sidewall; and said second bottom wall;
wherein said second opening permits said user-driver to slide said second fitted sheath over said second vehicle side mirror;

wherein said second opening comprising at least on elastic band located around a periphery of said second opening to permit said second fitted sheath to accommodate various sized models of said second vehicle side mirror;

wherein said second fitted sheath further comprises a transparent section dimensioned to fit over said second vehicle side mirror thereby allowing said user-driver unimpeded view out of said second vehicle side mirror in order to prevent said second fitted sheath not having to be removed when said vehicle is in an in-use condition;

wherein said at least one second adjustable securing band is removably attachable about said second vehicle side mirror to secure said second fitted sheath to said second vehicle side mirror;

wherein said at least one second adjustable securing band comprises at least one fastener;

wherein said at least one fastener comprises at least one drawstring;

wherein said protective mirror cover removably-coupleable to a vehicle side mirror assembly does not obstruct viewing out of said vehicle side mirror for aiding a user-driver to see areas behind and to a driver side and a passenger side of said vehicle, outside of peripheral vision of said user-driver; and wherein said protective mirror cover is adapted to protect said first vehicle side mirror and said second vehicle side mirror from dirt and insects, as well as inclement weather and harsh elements including rain, hail, ice and snow, without detracting from an aesthetic appearance of a finish of said vehicle.

19. The protective mirror cover removably-coupleable to a vehicle side mirror system of claim 18 further comprising a kit including said at least one first fitted sheath in a user-preferred color or design; said at least one at least one second fitted sheath in a user-preferred color or design; and a set of user-installation instructions.

\* \* \* \* \*